United States Patent
Li et al.

(10) Patent No.: US 12,269,456 B2
(45) Date of Patent: Apr. 8, 2025

(54) METHOD AND SYSTEM FOR CONTROLLING A POWERTRAIN IN A HYBRID VEHICLE

(71) Applicants: Cummins Inc., Columbus, IN (US); Ke Li, Columbus, IN (US); Kenneth M. Follen, Greenwood, IN (US); Anant Puri, Columbus, IN (US); John P. Kresse, III, Columbus, IN (US); Apurva Arvind Chunodkar, Greenwood, IN (US)

(72) Inventors: Ke Li, Columbus, IN (US); Kenneth M. Follen, Greenwood, IN (US); Anant Puri, Columbus, IN (US); John P. Kresse, III, Columbus, IN (US); Apurva Arvind Chunodkar, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 162 days.

(21) Appl. No.: 17/770,598

(22) PCT Filed: Nov. 6, 2019

(86) PCT No.: PCT/US2019/059961
§ 371 (c)(1),
(2) Date: Apr. 20, 2022

(87) PCT Pub. No.: WO2021/091543
PCT Pub. Date: May 14, 2021

(65) Prior Publication Data
US 2022/0363238 A1    Nov. 17, 2022

(51) Int. Cl.
*B60W 20/15*    (2016.01)
*B60W 10/06*    (2006.01)
(Continued)

(52) U.S. Cl.
CPC .......... *B60W 20/15* (2016.01); *B60W 10/06* (2013.01); *B60W 10/08* (2013.01); *B60W 10/26* (2013.01);
(Continued)

(58) Field of Classification Search
CPC ...... B60W 20/15; B60W 10/06; B60W 10/08; B60W 10/26; B60W 40/04; B60W 40/076;
(Continued)

(56) References Cited

U.S. PATENT DOCUMENTS 6,826,460 B2    11/2004 Kittell
7,102,496 B1 *    9/2006 Ernst, Jr. .......... G08G 1/096725
340/436
(Continued)

FOREIGN PATENT DOCUMENTS

WO    2016022659 A1    2/2016

OTHER PUBLICATIONS

International Search Report and Written Opinion for International Patent Application No. PCT/US2019/059961, filed Nov. 6, 2019, mailed Jan. 15, 2020.

*Primary Examiner* — Jaime Figueroa
(74) *Attorney, Agent, or Firm* — Faegre Drinker Biddle & Reath LLP

(57) ABSTRACT

Methods and systems for a powertrain power management in a vehicle with an electric motor, and an engine are disclosed. The methods and systems involve a powertrain that is operatively coupled to the engine and the electric motor, and an optimizer module operatively coupled to the powertrain. The optimizer module receives an operator information to travel a route from a remote management module, receives current route information for the route from a mapping application in response to the operator
(Continued)

information, measures current vehicle status information for the hybrid vehicle, and decides a power management strategy for the vehicle based on the current route information and the current vehicle status information.

18 Claims, 6 Drawing Sheets

(51) Int. Cl.
| | |
|---|---|
| *B60W 10/08* | (2006.01) |
| *B60W 10/26* | (2006.01) |
| *B60W 20/12* | (2016.01) |
| *B60W 40/04* | (2006.01) |
| *B60W 40/076* | (2012.01) |
| *B60W 50/02* | (2012.01) |
| *G01C 21/00* | (2006.01) |

(52) U.S. Cl.
CPC .......... *B60W 40/04* (2013.01); *B60W 40/076* (2013.01); *B60W 50/0205* (2013.01); *G01C 21/3889* (2020.08); *B60W 2510/242* (2013.01); *B60W 2552/15* (2020.02); *B60W 2555/20* (2020.02); *B60W 2555/60* (2020.02); *B60W 2556/10* (2020.02); *B60W 2556/50* (2020.02)

(58) Field of Classification Search
CPC ....... B60W 50/0205; B60W 2510/242; B60W 2552/15; B60W 2555/20; B60W 2555/60; B60W 2556/10; B60W 2556/50; G01C 21/3889
USPC ....................................................... 701/1, 22
See application file for complete search history.

(56) References Cited

U.S. PATENT DOCUMENTS

| | | | |
|---|---|---|---|
| 7,832,511 B2* | 11/2010 | Syed ...................... B60W 20/11 | 701/57 |
| 7,849,944 B2 | 12/2010 | Devault | |
| 7,988,594 B2* | 8/2011 | Heap .................... B60W 10/105 | 477/3 |
| 8,086,364 B2 | 12/2011 | Xue et al. | |
| 8,103,414 B2 | 1/2012 | Boss | |
| 8,249,770 B2* | 8/2012 | Bennewitz ............. B60K 6/547 | 903/905 |
| 8,396,634 B2* | 3/2013 | Heap ..................... B60W 10/06 | 701/55 |
| 8,406,970 B2* | 3/2013 | Heap ..................... B60W 10/10 | 180/65.21 |
| 8,790,215 B2 | 7/2014 | Sujan et al. | |
| 9,079,505 B1* | 7/2015 | Hyde ..................... G08G 1/202 | |
| 9,150,218 B2* | 10/2015 | Makabe ................ B60W 10/02 | |
| 9,235,817 B2 | 1/2016 | Sujan | |
| 9,878,608 B2* | 1/2018 | Biderman ............... B60L 53/00 | |
| 9,914,449 B2* | 3/2018 | Yamazaki ........... B60W 30/143 | |
| 10,081,355 B2* | 9/2018 | Sujan ..................... B60K 6/442 | |
| 10,099,569 B2 | 10/2018 | Lindemann | |
| 10,124,792 B2 | 11/2018 | Books et al. | |
| 11,072,323 B2* | 7/2021 | Lassenberger ........ B60W 20/14 | |
| 2002/0188387 A1* | 12/2002 | Woestman .............. B60L 50/16 | 180/65.235 |
| 2007/0118502 A1 | 5/2007 | Aragones | |
| 2007/0169970 A1 | 7/2007 | Kydd | |
| 2007/0173993 A1 | 7/2007 | Nielsen | |
| 2010/0094496 A1* | 4/2010 | Hershkovitz ........... B60L 50/66 | 701/22 |
| 2011/0057783 A1* | 3/2011 | Yagi ....................... G08G 1/166 | 348/148 |
| 2012/0090301 A1* | 4/2012 | Sujan ..................... B60W 10/06 | 60/285 |
| 2012/0303397 A1* | 11/2012 | Prosser .................. B60L 53/18 | 705/7.12 |
| 2015/0127479 A1* | 5/2015 | Penilla ..................... H04B 5/79 | 705/305 |
| 2017/0169634 A1 | 6/2017 | Mattern | |
| 2017/0307391 A1* | 10/2017 | Mason ................... G08G 1/202 | |
| 2018/0022405 A1* | 1/2018 | Gecchelin ............ G05D 1/0088 | 701/23 |
| 2018/0047224 A1 | 2/2018 | Clark, IV | |
| 2018/0154898 A1* | 6/2018 | Wrobel ............... B60W 50/085 | |
| 2019/0107406 A1* | 4/2019 | Cox ......................... G01S 19/42 | |
| 2020/0349833 A1* | 11/2020 | Lerner ............... G08G 1/096725 | |
| 2021/0039513 A1* | 2/2021 | Konrardy .............. H04L 67/306 | |

* cited by examiner

300

METHOD AND SYSTEM FOR CONTROLLING A POWERTRAIN IN A HYBRID VEHICLE

GOVERNMENT SUPPORT CLAUSE

This invention was made with Government support under Award Number(s) DE-EE0007514 awarded by the Department of Energy. The Government has certain rights in this invention.

CROSS-REFERENCE TO RELATED APPLICATION

This application claims priority to International Patent Application No. PCT/US2019/059961, filed Nov. 6, 2019, the complete disclosure of which is incorporated herein by reference in its entirety.

FIELD OF THE DISCLOSURE

The present disclosure relates generally to hybrid vehicles, especially to controlling a powertrain of the hybrid vehicles.

BACKGROUND OF THE DISCLOSURE

Recently, there has been an increased demand for vehicles with hybrid powertrains, i.e. hybrid vehicles with multiple forms of motive power, to meet criteria such as improved fuel economy and reduced emissions, all the while maintaining optimal performance for the user. Such hybrid vehicles that are equipped with an electric powertrain with a battery and a range extender generally include controls for determining from which of the available onboard power sources to supply to the electric powertrain. For example, the controls may choose between the battery and the range extender to be the power source for the powertrain, and the controls may choose the amount of energy to be provided from each source of energy. These controls may include a target state of charge profile to govern this power split (including starting and ending state of charge, and trajectory) as well as targets or decisions on how and when the range extender is operated. The references used for the powertrain can have a significant impact on factors such as fuel economy, performance, emissions, and component life. However, the controls as presently known in the art use a single calibration or a set of references as chosen globally for many or all use cases for a given vehicle. That is, the control is preset with a set of predetermined rules that are used for the control to determine which of the power sources to use to obtain energy, and how much energy is to be obtained from each power source. Because there are many different elements that affect the aforementioned factors of the vehicle, it is difficult for the control to arrive at a decision that is optimal with respect to all of: fuel economy, performance, emissions, and component life.

In view of the above examples, there is a need for a control system that can more flexibly and dynamically control the hybrid powertrains in hybrid vehicles such that operation of the electric motor and the engine is operated in a way that optimizes fuel economy, performance, emissions, and component life of the hybrid vehicle.

SUMMARY OF THE DISCLOSURE

Various embodiments of the present disclosure relate to systems to controlling a powertrain in a hybrid vehicle that includes an engine and an electric motor. In one embodiment, a drive system of a hybrid vehicle is provided which includes an engine, an electric motor with an energy storage device electrically coupled thereto, a powertrain operatively coupled to the engine and the electric motor, an optimizer module operatively coupled to the powertrain. The optimizer module configured to receive from a remote management module an operator information to travel a route, receive current route information for the route from a mapping application in response to the operator information, measure current vehicle status information for the hybrid vehicle, and decide a power management strategy for the vehicle based on the current route information and the current vehicle status information.

In one embodiment, the powertrain is configured to control, based on the power management strategy, at least one of: the engine, the electric motor, or the energy storage device of the vehicle. In one embodiment, the current vehicle status information includes at least one of: vehicle type and architecture, vehicle availability, vehicle mass, vehicle mileage, a state of charge (SOC) of the energy storage device and an amount of time to fully recharge the same, a state of health (SOH) of the energy storage device, an amount of fuel in a fuel tank fluidly coupled to the engine and an amount of time to fully refuel the same, or a full range of the vehicle based on the SOC or the amount of fuel.

In one embodiment, the optimizer module further configured to provide powertrain proprietary information of the vehicle to the remote management module after the vehicle completes traveling the route. In one embodiment, the powertrain proprietary information includes at least one of: fuel and energy efficiency information, component life information, fault conditions, or chance of derating of the vehicle. In one embodiment, the current route information includes at least one of: speed limit information, road grade information, refueling station location information, charging station location information, traffic information, weather information, terrain information, and zoning information. In one embodiment, the optimizer module decides the power management strategy by using online learning from historical and lookahead data. In one embodiment, the drive system further includes a plurality of sensors operable to measure the current vehicle status information, wherein the power management strategy is further decided using a digital twin to monitor the plurality of sensors.

In one embodiment, a method for operating a hybrid vehicle is provided. The hybrid vehicle has an engine, an electric motor, a powertrain operatively coupled to the engine and the electric motor, and an optimizer module operatively coupled to the powertrain. The method includes receiving an operator information to travel a route by the optimizer module from a remote management module, receiving current route information for the route by the optimizer module from a mapping application, measuring current vehicle status information for the hybrid vehicle, and deciding a power management strategy for the vehicle by the optimizer module based on the current route information and the current vehicle status information.

In one embodiment, the method also includes controlling at least one of the engine, the electric motor, or an energy storage device coupled to the electric motor of the vehicle by the powertrain based on the power management strategy. In one embodiment, the current vehicle status information includes at least one of: vehicle type and architecture, vehicle availability, vehicle mass, vehicle mileage, a state of charge (SOC) of an energy storage device coupled to the electric motor and an amount of time to fully recharge the same, a state of health (SOH) of the energy storage device, an amount of fuel in a fuel tank coupled to the engine and an amount of time to fully refuel the same, or a full range of the vehicle based on the SOC or the amount of fuel.

In one embodiment, the method also includes providing powertrain proprietary information of the vehicle by the optimizer module to the remote management module after the vehicle completes traveling the route. In one embodiment, the powertrain proprietary information includes at least one of: fuel and energy efficiency information, component life information, fault conditions, or chance of derating of the vehicle. In one embodiment, the current route information includes at least one of: speed limit information, road grade information, refueling station location information, charging station location information, traffic information, weather information, terrain information, or zoning information.

In one embodiment, a vehicle fleet management system is provided. The management system includes a plurality of hybrid vehicles, each vehicle comprising an engine with a fuel tank fluidly coupled thereto, an electric motor with an energy storage device electrically coupled thereto, a powertrain operatively coupled to the engine and the electric motor, and an optimizer module operative coupled to the powertrain. The management system also includes a remote management module operative to receive powertrain proprietary information each of the plurality of hybrid vehicles from the optimizer module, determine which of the plurality of hybrid vehicles to instruct to travel a route based on the powertrain proprietary information, and transmit an operator information to travel the route to the determined hybrid vehicle. The optimizer module of the determined vehicle is configured to receive current route information for the route from a mapping application in response to the operator information, measure current vehicle status information for the hybrid vehicle, and decide a power management strategy for the vehicle based on the current route information and the current vehicle status information. The powertrain of the determined vehicle is also configured to control at least one of the engine or the electric motor of the vehicle based on the power management strategy.

In one embodiment, the power management strategy is decided by the optimizer module using online learning from historical and lookahead data. In one embodiment, the power management strategy is further decided using a digital twin to monitor a plurality of sensors operable to measure the current vehicle status information. In one embodiment, the optimizer module is an on-board optimizer module located in the hybrid vehicle. In one embodiment, the on-board optimizer module is electrically coupled to a processing unit within the powertrain. In one embodiment, the optimizer module is an off-board optimizer module accessible via wireless communication. In one embodiment, the off-board optimizer module is accessible via cloud network. In one embodiment, the current route information is included as part of the operator information. In one embodiment, the operator information further includes operator request information.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

Figure 1:
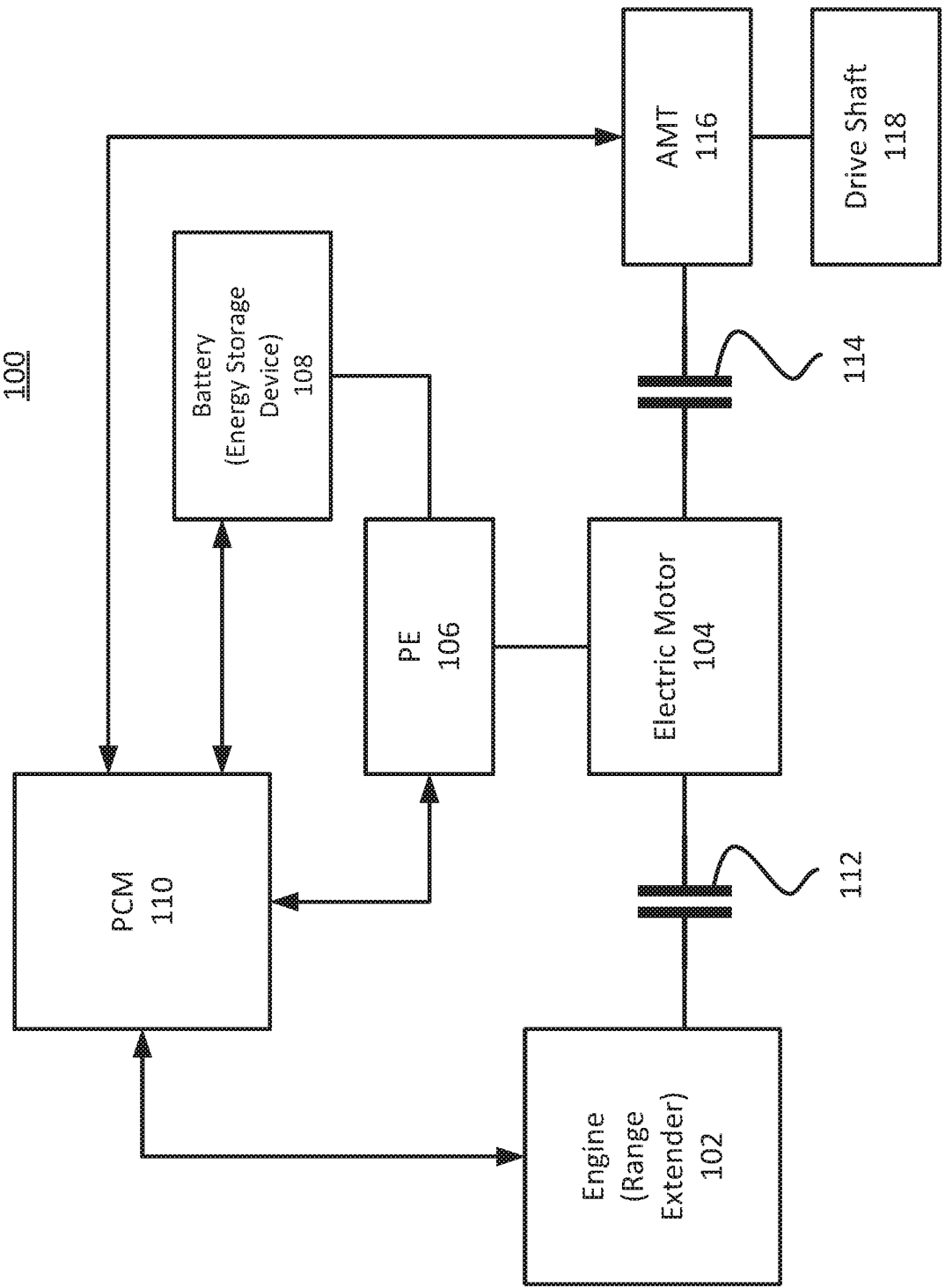
FIG. 1 is a block diagram of an example of a drive system in a Full Hybrid Electric Vehicle (FHEV) architecture in a certain layout according to one embodiment.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

As shown in FIG. 1, a hybrid powertrain 100 with a parallel hybrid architecture typically has an engine 102 powered by fuel such as gasoline or diesel engine and an electric motor 104 controlled by a power electronics (PE) module 106 and powered by a battery 108. A powertrain control module (PCM) 110 controls the operation of the engine 102, the PE module 206, the battery 108, and an automated manual transmission (AMT) 116. A clutch 112 is located between the engine 102 and the electric motor 104, and another clutch 114 is located between the electric motor 104 and the AMT 116, which is also controlled by the PCM 110. Other configurations of the parallel hybrid architecture are also applicable. The engine 102 can be any suitable fuel-powered engine such as an internal combustion engine (ICE), whereas the types of engine include petrol engines, diesel engines, gas turbines, and so on. The electric motor 104 may be any suitable electricity-powered motor-generator including AC brushless motors, DC brushed motors, DC brushless motors, direct drive rotary motors, linear motors, and so on, that can convert between electrical energy and mechanical energy. Furthermore, the engine 104 can be an auxiliary power unit such as a range extender which charges the battery 108 when the battery is depleted. The range extender may be any one or more of: diesel genset, gasoline genset, natural gas genset, fuel cell, etc.

The layout of the hybrid powertrain 100 is that of a Full Hybrid Electric Vehicle (FHEV) architecture which enables different hybrid modes to drive the vehicle. For example, in an electric only mode, the clutch 112 is in an open position such that the engine 102 provides no power and instead the battery 108 provides the energy to power the electric motor 104. Therefore, electrical energy flows from the battery 108 to the electric motor 104, and mechanical energy flows from the motor 104 to the drive shaft 118. In a hybrid/electric assist mode, the clutch 112 is in a closed position such that both the engine 102 and the electric motor 104 provide power to the AMT 116. Therefore, mechanical energy flows from the engine 102 to the electric motor 104 and then to the drive shaft, and electrical energy flows from the battery 108 to the electric motor 104 after which it is converted to mechanical energy which then flows to the drive shaft 118. In a battery charging mode, the clutch 112 is in the closed position and the engine 102 provides all the power to the AMT 116 while also providing mechanical energy to the electric motor 104 to enable the motor 104 to convert the mechanical energy to electrical energy, which is then stored in the battery 108. Therefore, mechanical energy flows from the engine 102 to the electric motor 104, after which the mechanical energy is directed to the drive shaft 118 and the electrical energy is directed to the battery 108. Lastly, in a regenerative braking mode, the clutch 112 is in the open position and no power is provided to the AMT 116 from either of the engine 102 and the motor 104, so the vehicle will eventually come to a stop. While the vehicle is in motion, the mechanical energy from the drive shaft 118 are converted to electrical energy by the electric motor 104, after which the electrical energy is stored in the battery 108. Therefore, mechanical energy flows from the drive shaft 118 to the electric motor 104, and the electrical energy flows from the motor 104 to the battery 108.

In some embodiments, the hybrid powertrain 100 can have a different layout from what is shown in FIG. 1. For example, hybrid powertrains can have parallel, series, and mixed series/parallel designs, all of which are collectively known as "power split architecture". In a parallel design as well as a mixed series/parallel designs, the internal combustion engine charges the battery and is also mechanically connected to the wheels of the vehicle to provide tractive power. In a series design, the internal combustion engine is solely used for the purpose of powering the battery or the electric drive motor by driving the generator to generate power. In another example, a four-mode hybrid electric vehicle (HEV) includes an internal combustion engine and two motors to provide four modes of operation: (1) the electric vehicle (EV) mode, (2) the range extended (RE) mode, (3) the hybrid mode, and (4) the engine mode. Different modes have different properties, and the four-mode HEV has the advantage of adjusting these modes to suit different situations. In some embodiments, the powertrain pertains to a battery electric vehicle (BEV) which has only motor(s) and no engine and thus is for an all-electric vehicle. In some embodiments, the genset associated with the powertrain is powered using diesel, gasoline, propane, natural gas, or solar energy. In some embodiments, the powertrain 100 uses a fuel cell that converts chemical energy of a fuel and an oxidizing agent into electricity through redox reactions, where the fuel is often hydrogen and the oxidizing agent is often oxygen.

Figure 2:
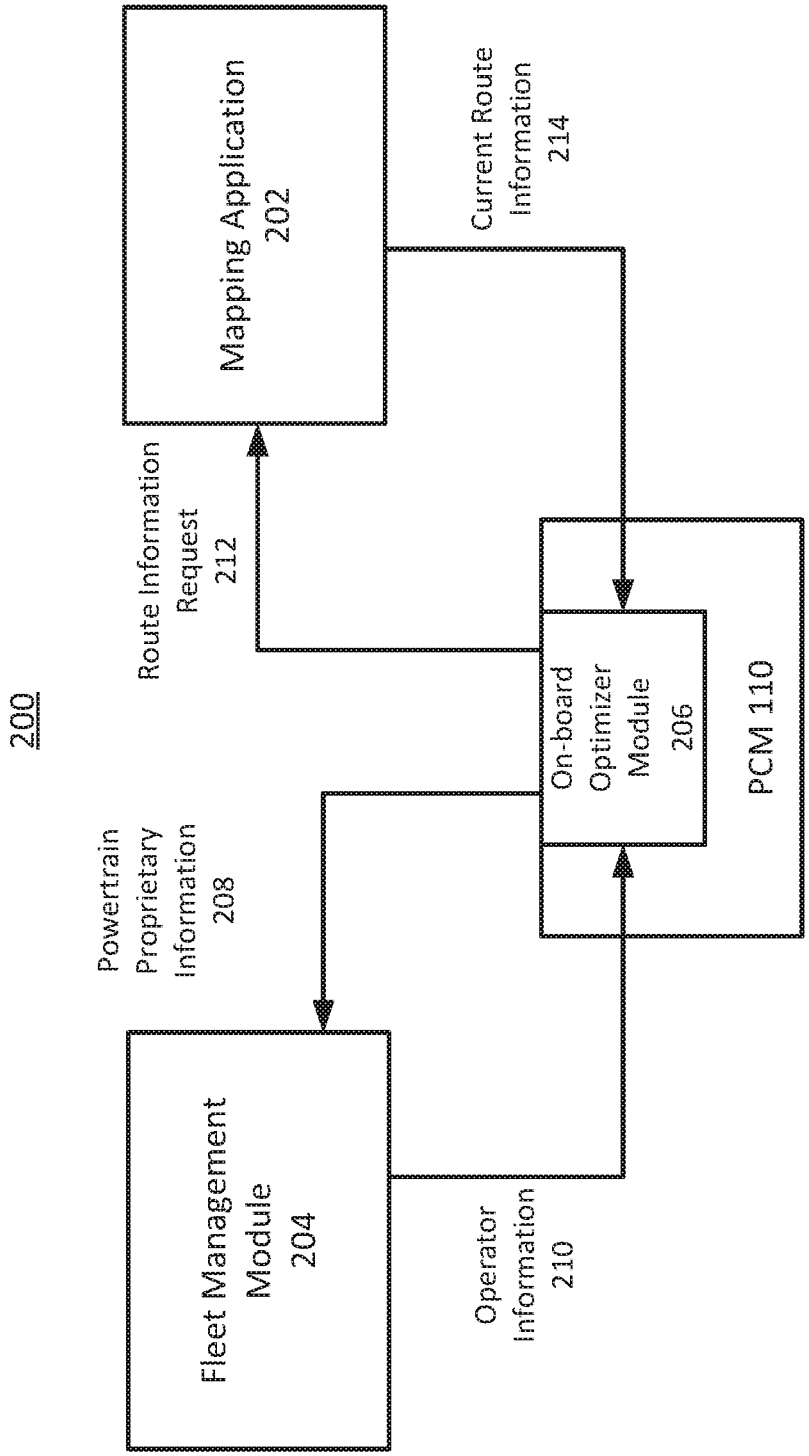
FIG. 2 is a block diagram of an example of a hybrid powertrain system with a fleet management module as well as a mapping application according to one embodiment.
Figure 5:
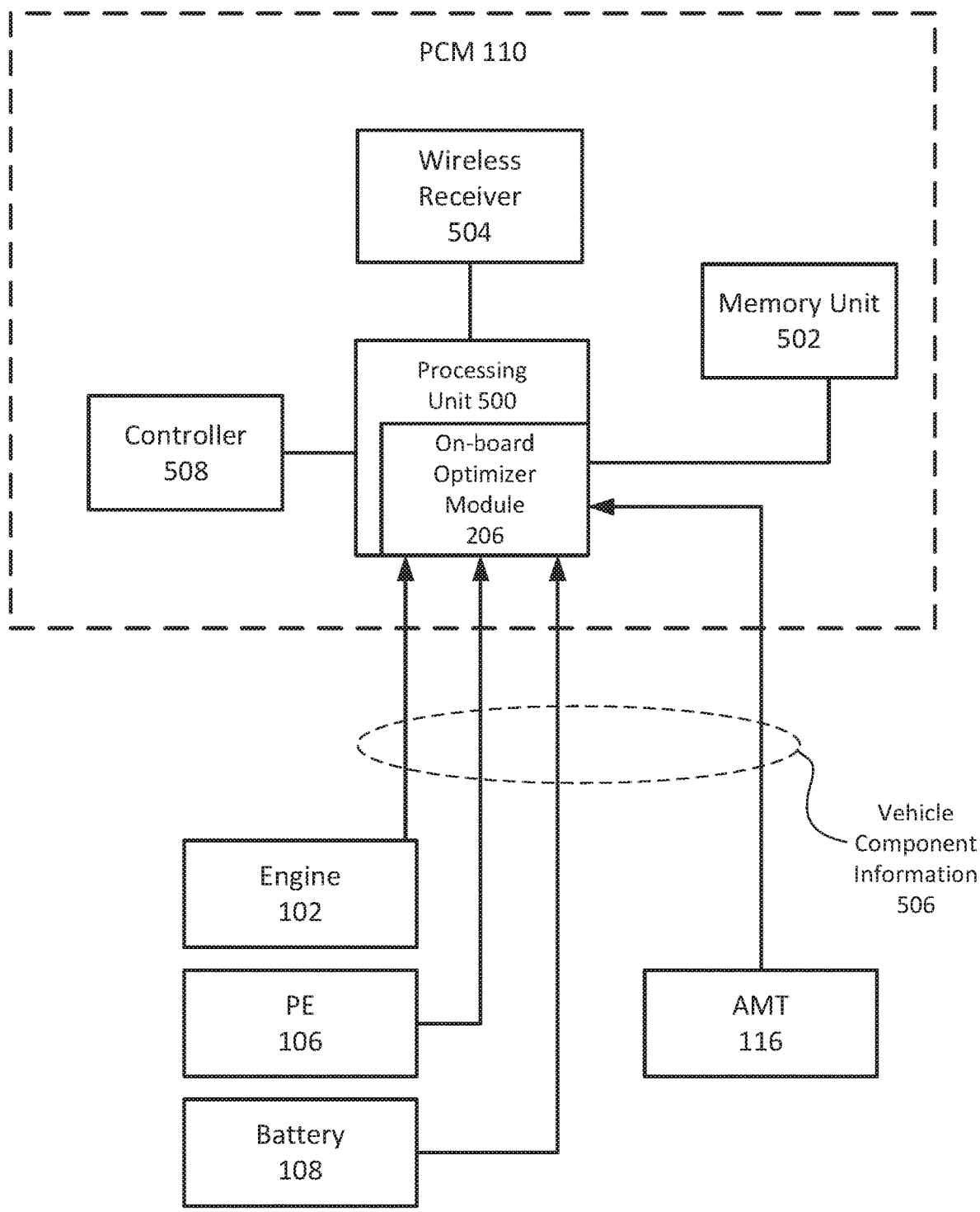
FIG. 5 is a block diagram of an example of the powertrain control module as shown in FIG. 1 according to one embodiment.

FIG. 2 shows a hybrid powertrain control system 200 which includes the powertrain 100 (more specifically, the PCM 110 of the powertrain 100) as well as a mapping application 202, a fleet management module 204, and an on-board optimizer module 206. Each of the mapping application 202 and the fleet management module 204 is located remotely from the powertrain 100 and is accessed wirelessly or wired via any suitable means of digital communication, such as via the Internet, local area network (LAN), controller area network (CAN) bus, cloud network, etc. The on-board optimizer module 206 is located in the PCM 110, for example coupled to a processing unit 500 of the PCM 110 as shown in FIG. 5. The mapping application 202 is any software application which enables a user to obtain information regarding the route to be traveled. In one example, the mapping application 202 gathers information regarding any one or more of the following: traffic, weather forecast, road condition, terrain condition, zero-emission zone areas, tollway location, geofenced areas, etc. The fleet management module 204 is any computing device or a system of computing devices capable of managing data regarding the proprietary information of each vehicle in a fleet of hybrid vehicles and storing the most up-to-date information regarding each vehicle in the fleet. For example, the module 204 can be implemented as a command center which has the power to give instructions to each of the vehicles in a fleet of vehicles, where each vehicle contains a hybrid powertrain similar to the powertrain 100 shown in FIG. 1. The information stored in the fleet management module 204 include but are not limited to powertrain capabilities such as possible ranges of travel, ability to meet a travel mission without derating, ability to meet zero emission requirements, etc. Furthermore, in some examples, the information includes the current battery and/or fuel states of the vehicle as well as different system health statuses such as battery degradation, fault conditions, and so on.

In one example, the fleet management module 204 receives instruction, for example from a user, that a trip needs to be made by any one of the available hybrid vehicles in the fleet. In response to this instruction, the module 204 receives current powertrain proprietary information 208 from the on-board optimizer module 206, either via wired or wireless digital communication as mentioned above. The proprietary information in this case includes at least one of: current state of charge (SOC) of the battery, an estimate of the full range of the electric vehicle, time to fully charge and refuel, component system health/degradation status, powertrain type/architecture (e.g., battery electric vehicles (BEV), range-extended electric vehicles (REEV), range-extended battery-electric vehicle (BEVx), etc.), mileage, vehicle class, autonomy level and status, availability of the vehicle for the mission, and the physical location where the vehicle is parked.

After receiving the proprietary information 208 of the vehicles in the fleet, the fleet management module 204 decides which one of the vehicle is most suited for the task. For example, the decision can depend on one or more of the following factors: performance, efficiency, emission requirements, component life optimization, and a balance among these factors. Performance factors may include whether the vehicle is able to travel the route smoothly and with the best driving experience for the user. This is achieved by having a higher horsepower or larger engine size for faster response. Efficiency factors may include the energy efficiency, fuel economy (e.g., miles-per-gallon measurement), weight-specific efficiency, and so on. Such factors place more weight on the cost of making the trip, for example the cost of fuel and cost of hiring drivers for certain trips. Emission requirement factors include the efficiency of the aftertreatment system of the vehicle, how much of the power can be provided from the electric motor instead of the engine, and so on. Emission requirement may play an important role in some areas because such areas have stricter emission requirements than others, or in some cases require vehicles to be emission-free (e.g. zero-emission zones). Component life optimization factors include the state of health (SOH) of the battery, engine, motor, and transmissions of the vehicle. Especially important is the SOH of the battery due to the decrease in the amount of energy that can be stored in the battery after prolonged use.

When the decision is made by the fleet management module 204 as to which vehicle in the fleet is best suited for the task, operator information 210 is sent to the vehicle, or more specifically the PCM 110 of the vehicle. The PCM 110 then sends a route information request 212 to the mapping application 202 to which the mapping application 202 responds by sending current route information 214 to the PCM 110. In one example, instead of the PCM 110 requesting for the route information, the fleet management module 204 can send the request 212 to the mapping application 202 at the same time as sending the operator information 210 to the PCM 110, after which the mapping application 202 forwards the resulting route information 214 to the PCM 110. In some examples, the operator information 210 includes not only the routing information of the trip but also operator requests which are specific requests that the fleet management module 204 has for the powertrains 100 in each vehicle. For example, if there is not enough time to fully charge the battery 108 before the next trip, the fleet management module 204 may send a request indicating that the battery 108 at the end of the day must be at a specific charge level, so there is still sufficient power for the powertrain 100 to operate on the following day. In another example, the powertrain 100 has a set of different presets modes in which the powertrain 100 is capable of operating, with each preset mode achieving a different result from another. For example, in one preset mode, greater emphasis is placed on optimizing fuel economy, while in another preset mode, the overall performance, emission level, and/or component life of the powertrain 100 may be emphasized. As such, if the fleet management module 204 intends to put greater emphasis on one of fuel economy, performance, emissions, and component life, the fleet management module 204 can transmit the operator information 210 that includes the preferred preset mode.

In some examples, the operator requests include fleet performance preference, which is based on whether the operator wants to adjust the powertrain system operation to optimize vehicle performance, efficiency, emission reduction, component life, or a balanced performance among any of these factors. In some examples, the operator requests enable one or more range extender to charge the battery of the vehicle to a specified state of charge, or the powertrain to target a specified state of charge at the end of a mission.

The PCM 110 uses the information 214 to determine a power management strategy and controls the engine 102 and the motor 104, as well as the other components in the powertrain 100, according to this power management strategy. The means for doing so is discussed further herein. After the task is completed, the PCM 110 performs measurements and calculates updated powertrain proprietary information 208 based on the measurements that at the end of the task or trip. Then, the on-board optimizer module 206 of the PCM 110 sends the updated powertrain proprietary information 208 to the fleet management module 204 to overwrite the old powertrain proprietary information stored therein, such that when the fleet management module 204 makes decisions in the future, it is able to use the updated powertrain proprietary information 208 for the vehicle instead of the old and outdated powertrain proprietary information 208 that is no longer relevant. As such, the fleet management module 204 always accesses the most up-to-date proprietary information to assist it in making decisions as to which vehicle to instruct to travel.

Figure 3:
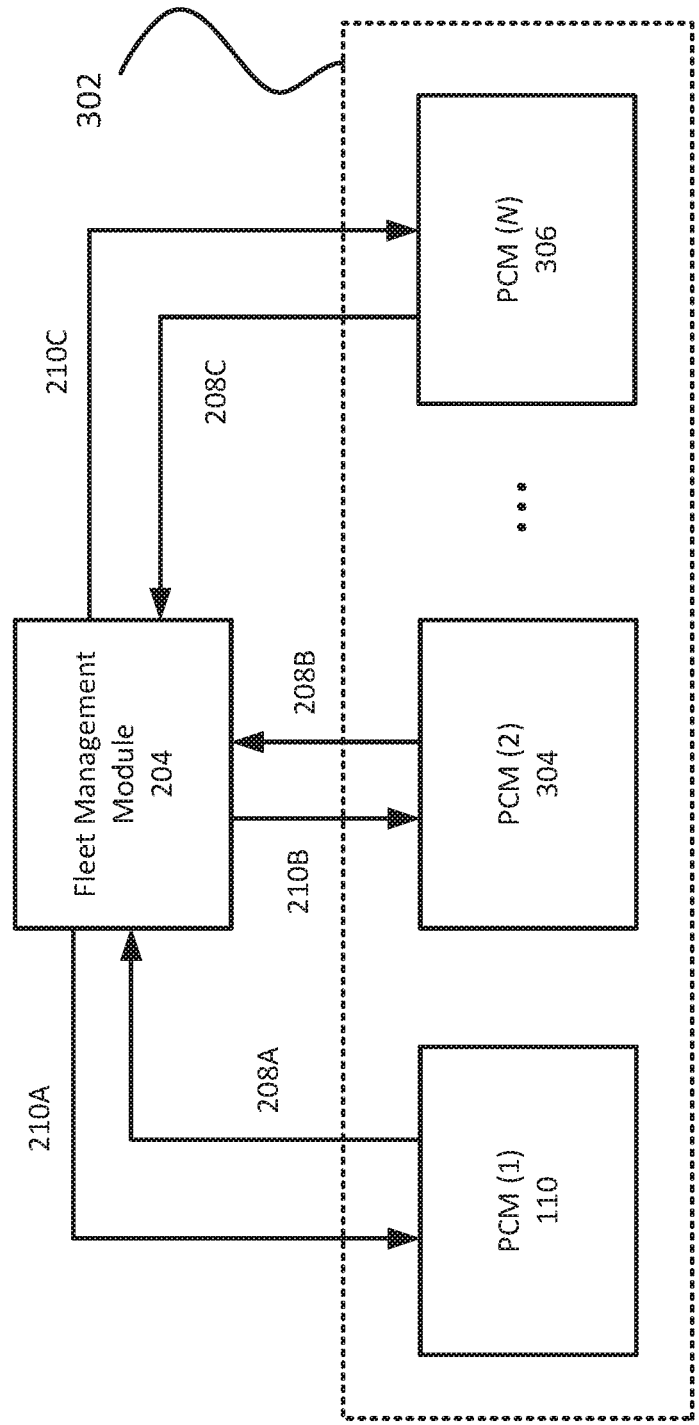
FIG. 3 is a block diagram of an example of a hybrid powertrain fleet management system with a fleet management module to control a fleet of hybrid powertrains according to one embodiment.

FIG. 3 shows a hybrid powertrain fleet management system 300 which utilizes the hybrid powertrain control system 200 in FIG. 2 but applied to a fleet 302 of vehicles, each marked with a number from (1) to (N). Each vehicle has a hybrid powertrain and thus a PCM that is independent of other PCMs, and each PCM can receive the operator information 210 from the fleet management module 204, receive the current route information 214 from the mapping application 202, and send the updated powertrain proprietary information 208 to the fleet management module 204 after each trip. In the system 300, the fleet management module 204 has not only one but a plurality of tasks or trips to complete and thus needs to decide which of the vehicles to instruct for these trips. In one example, a group of vehicles is selected from the fleet 302 such that each vehicle in the group receives one set of operator information 210. In another example, one or more of the vehicles may receive two or more sets of operator information 210 because doing so is optimal compared to sending the instructions to a different vehicle. For example, when all but one of the vehicles have low SOC in their batteries, and that one vehicle has a high enough SOC in its battery such that the vehicle alone can accomplish all the tasks before the batteries of the other vehicles are charged, the fleet management module 204 may instruct the single vehicle with the high SOC to make all the trips. It should be noted that such operator information 210 will be determined by the fleet management module 204 using a plurality of factors and not just the SOC of the batteries in the vehicles. It should also be noted that the vehicles may be parked or traveling at different locations when the fleet management module 204 is making the decision. As such, the availability of the vehicles, such as whether they are already running an errand or not within a reasonable distance from the destination to make the trip, also comes into consideration.

In the example shown in FIG. 3, the fleet management module 204 sends operator information 210A to the first PCM 110, operator information 210B to a second PCM 304, and operator information 210C to an Nth PCM 306, based on the powertrain proprietary information 208. In some examples, the fleet 302 includes a plurality of types of vehicles such that the specification of a vehicle varies from that of another. For example, one vehicle may have a larger engine, better fuel economy, batteries with better SOH and thus can carry more energy, tires better suited for rugged terrains or harsher weather conditions, and/or greater capacity to accommodate more passengers, etc., than another vehicle in the fleet 302. For example, the vehicles may employ different powertrain architectures or use different types of fuels (gasoline, diesel, ethanol, biodiesel, natural gas, etc.). These specifications are also included in the proprietary information 208 to be used by the management module 204 when making decisions. After each of the PCMB 110, 304, and 306 finishes making the assigned trip, they each sends updated powertrain proprietary information 208A, 208B, and 208C, respectively, to the fleet management module 204 to keep the data in the fleet management module 204 up-to-date.

In one example, the management module 204 performs prognostics on each of the vehicles in the fleet 302 to detect any component degradation, and then determine and schedule service on the vehicles if such degradation is detected. The management module 204 can also trigger active diagnostic tests on the components of powertrain system 100 as shown in FIG. 1. The management module 204 then recommends the appropriate vehicle for different missions and routes, based on the powertrain system status as detected from analyzing powertrain proprietary information 208.

Figure 4:
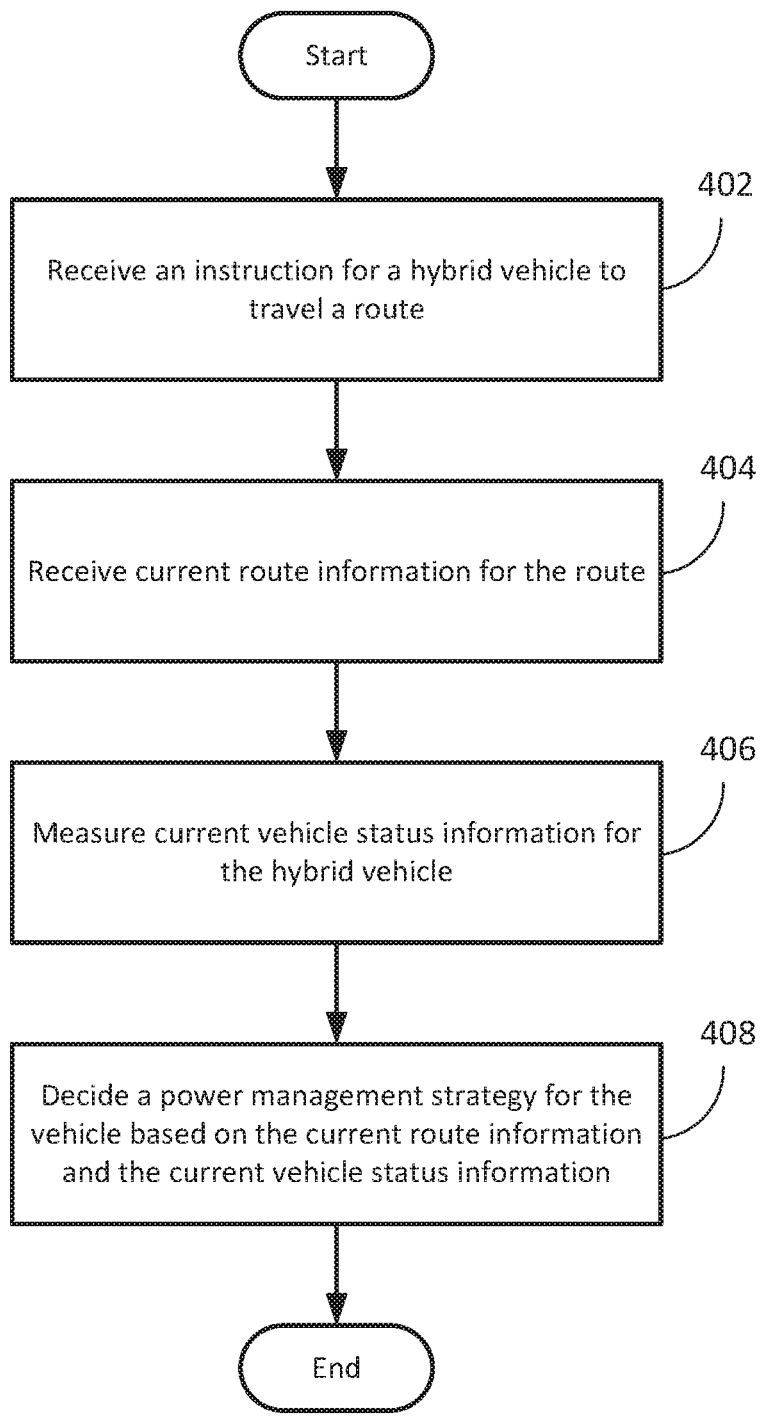
FIG. 4 is a flow chart illustrating a method of controlling a hybrid powertrain according to one embodiment.

FIG. 4 shows a method 400 of managing a hybrid powertrain as disclosed herein, according to an embodiment. In a first block 402, the optimizer module (for example the optimizer module 206) receives an instruction (for example the operator information 210) to travel a route. Then, in a second block 404, the optimizer module of the optimizer module receives current route information (for example the current route information 214). In one example, the current route information includes at least one of: traffic information, weather information, terrain information, and zoning information. In a third block 406, the optimizer module measures the current vehicle status information for the hybrid vehicle. In one example, the current vehicle status information includes a state of charge (SOC) of the energy storage device, a state of health (SOH) of the energy storage device, and an amount of fuel in the fuel tank. In a fourth block 408, the optimizer module decides a power management strategy for the vehicle based on the current route information and the current vehicle status information, for example by using online learning from historical and lookahead data. In some examples, the powertrain controls an engine and/or an electric motor (for example the engine 102 and the motor 104) based on the power management strategy after receiving it from the optimizer module. In one example, the optimizer module provides powertrain proprietary information (for example the updated powertrain proprietary information 208) to a remotely located fleet management module (for example the fleet management module 204) after the vehicle completes traveling the route. In one aspect of this example, the powertrain proprietary information includes fuel and energy efficiency information of the vehicle.

FIG. 5 shows the components of the PCM 110 according to one embodiment. The PCM 110 shown includes a processing unit 500, a memory unit 502, and a wireless receiver 504. The processing unit 500 can be any suitable processor such as a system-on-chip, central processing unit (CPU), or the like. The memory unit 502 can be any suitable memory such as static or dynamic random access memory (SRAM or DRAM), flash memory, or the like. The wireless receiver 504 can be any suitable digital wireless communication module to enable access to the Internet and/or Intranet, or the like. After the wireless receiver 504 receives the operator information 210 from the management module 204 and the current route information 214 from the mapping application 202 as previously explained, the receiver 504 sends the received data to the processing unit 500. The processing unit 500 also accesses the memory 502 to obtain the updated powertrain proprietary information 208 of the vehicle that was most recently sent to the fleet management module 204. In one example, the on-board optimizer module 206 in the processing unit 500 decides a power management strategy based on the current route information 214 and the powertrain proprietary information 208. In another example, the fleet management module 204 receives measurement data regarding the current vehicle status from a plurality of sensors coupled to different components within the powertrain 100. For example, a sensor coupled to the battery 108 can measure current SOC of the battery, and a sensor coupled to the engine 102 can measure current temperature of the engine 102 as well as the aftertreatment system (not shown) attached thereto. These measurement data are called vehicle component information 506 and are collected by the optimizer module 206 to decide the power management strategy.

The power management strategy includes control information for a target SOC profile and, if there is a need for a power split between the engine 102 and the motor 104, the starting/ending SOC levels and a trajectory to reach the target SOC. Furthermore, the engine 102 may be replaced by a range extender such as microturbines or fuel cells, the control information also includes how and when the range extender should be operated. In another example, the powertrain management strategy includes at least one of: battery SOC target profile, range extender operation (torque/speed operation, on/off target profile, etc.), target ending SOC, and target recharge amount (which takes into consideration the starting state of charge) for the battery. The processing unit 500 of the PCM 110 then controls one or more of the engine 102, PE 106, battery 108, and AMT 116 of the vehicle according to the powertrain management strategy through a controller 508 coupled to the processing unit 500.

The power management strategy is decided by the processing unit 500 using methods such as online learning which consider the historical and lookahead data for the accessory loads, driver's style of driving, predicted traffic, and environmental conditions. The historical data may be stored in the memory unit 502, and the lookahead data can be derived from the current route information 214. For example, the terrain and weather condition information can be utilized to determine the lookahead information for a potential load that is to be applied to the vehicle, the traffic information can be utilized to determine whether there is an opportunity to power the battery using the engine if the battery SOC is low, and the combination of these information can be utilized to predict an approximate time or distance traveled before the battery runs out of energy and thus requires charging via a charging station or a range extender. In one example, the processing unit 500 uses digital twin to form a digital representation of the physical components of the powertrain and compute the full range that can be traveled using the electrical vehicle components, as well as the fuel economy and the predicted time to charge or refuel the vehicle. Furthermore, measurement data as provided by the sensors can be used to update the digital twin copy of the vehicle in real time. The power management strategy also decides when to switch between different modes or settings. In one example, the power management strategy decides when to apply the electric-only mode, the hybrid/electric assist mode, the battery charging mode, and the regenerative braking mode as explained above to the powertrain system 100 to achieve the desired operating characteristic. The power management strategy may decide when to request the range extender to charge the battery 108 to a specified SOC, and when to request the powertrain 100 to target a specified SOC for the battery 108 at the end of the mission.

Furthermore, the power management strategy can be adjusted to achieve different results that fit certain requirements. For example, the power management strategy can be adjusted to optimize the performance aspect such that the engine 102 and motor 104 operates in a way that optimizes the driving experience for the driver of the vehicle. This strategy may involve locating where the gas stations and charging stations are, such that the driver is always able to drive with enough fuel or SOC to last until the next gas station or charging station en route. Alternatively, the power management strategy can be adjusted to optimize efficiency and minimize the cost for finishing the missions or tasks, especially for long-distance travels in which fuel efficiency plays a major role in keeping the cost low. In another example, the power management strategy may be adjusted to be ultra-green, such that emissions from the engine 102 is reduced as much as possible, if not eliminated entirely in some usages, which is an important factor if the vehicle travels to a zero-emission zone. Additionally, the power management strategy may focus on optimizing the component life for the vehicle, for example the battery 108. In the case of batteries, prolonged usage reduces the maximum capacity of the battery such that even when the battery is fully charged, the battery provides less energy than when the battery was newly installed. However, additional factors such as operating in low temperature further reduce the maximum capacity of the battery, known as derating. As such, in this instance, the power management strategy may be adjusted such that the overall throughput of the battery is minimized and the battery is kept at a relatively warm temperature to avoid such derating. Lastly, the power management strategy may be adjusted to achieve a more well-balanced result with regard to the aforementioned optimizations.

Listed below are some of the examples how the processing unit 500 of the PCM 110 optimizes the power management strategy. In one example, the processing unit 500 uses weather information to adjust the target SOC for the battery to account for the weather impact on battery capability and accessory loads. In one example, the processing unit 500 uses the weather information to adjust range extender operation, such as by operating the range extender for a longer period of time when the weather is cold to keep the aftertreatment system of the vehicle warm, in order to reduce emissions. In one example, the processing unit 500 optimizes cost efficiency based on the cost between the fuel energy and the electrical energy from power grids, so the processing unit 500 decides the level of SOC that the battery needs to be charged to before starting the mission. In one example, the processing unit 500 optimizes the travel route in view of the number and locations of refueling stations or charging stations along the route that the vehicle is to travel. In one example, the processing unit 500 optimizes cost efficiency by applying vehicle rate management based on the real-time traffic and fleet preferences, especially if there is heavy traffic on the route, to improve safety and fuel economy of the vehicle. In one example, the current route information 214 includes locations of fast-charging stations on the route, including the duration of charge, C-rate, and type of charging station. In one example, the processing unit 500 adjusts the power management strategy based on the load delivery amount for each stop made en route in order to improve accuracy of the energy estimation and thereby optimizing energy management for the powertrain. In one example, the processing unit 500 adjusts a base regenerative braking and a brake blending level to achieve desired braking performance based on weather and ambient conditions, for example reducing regenerative braking when the ambient temperature is high. In one example, the target SOC for the battery as determined at the beginning of the mission is adjusted to allow room for regenerative braking. In one example, the amount of regenerative braking is adjusted as training modes for new drivers of electric vehicles. In one example, stop duration and location of the vehicle are utilized by the processing unit 500 to determine if and when a diesel particulate filter (DPF) regeneration needs to be performed to "de-soot" the DPF if the range extender used is a diesel range extender. In one example, the processing unit 500 determines when to automatically switch to electrical-only mode in the hybrid powertrain based on geofencing or location information included in the route information 214. In one example, the processing unit 500 incorporates "smart charging" by analyzing the weather and battery information. For example, charging power is adjusted in cold weather to keep the battery warm at the start of the mission, and the charging power is adjusted based on the battery temperature to keep the battery temperature within the acceptable range.

Upon completion of a trip or mission, the PCM 110 provides the updated powertrain proprietary information 208 to the fleet management module 204, as previously mentioned, to aid the fleet management module 204 in making intelligent fleet logistic decisions in the future. The powertrain proprietary information may include the mission or trip that was completed, the charging time and cost of refueling to meet requirements for the trip, fuel economy during the trip, trip time, ability to meet zero-emission zones during the trip, chance of derating during the trip, and the expected SOC at the end of the trip. The trip information may also include the engine stop and start timing and duration of the trip.

Figure 6:
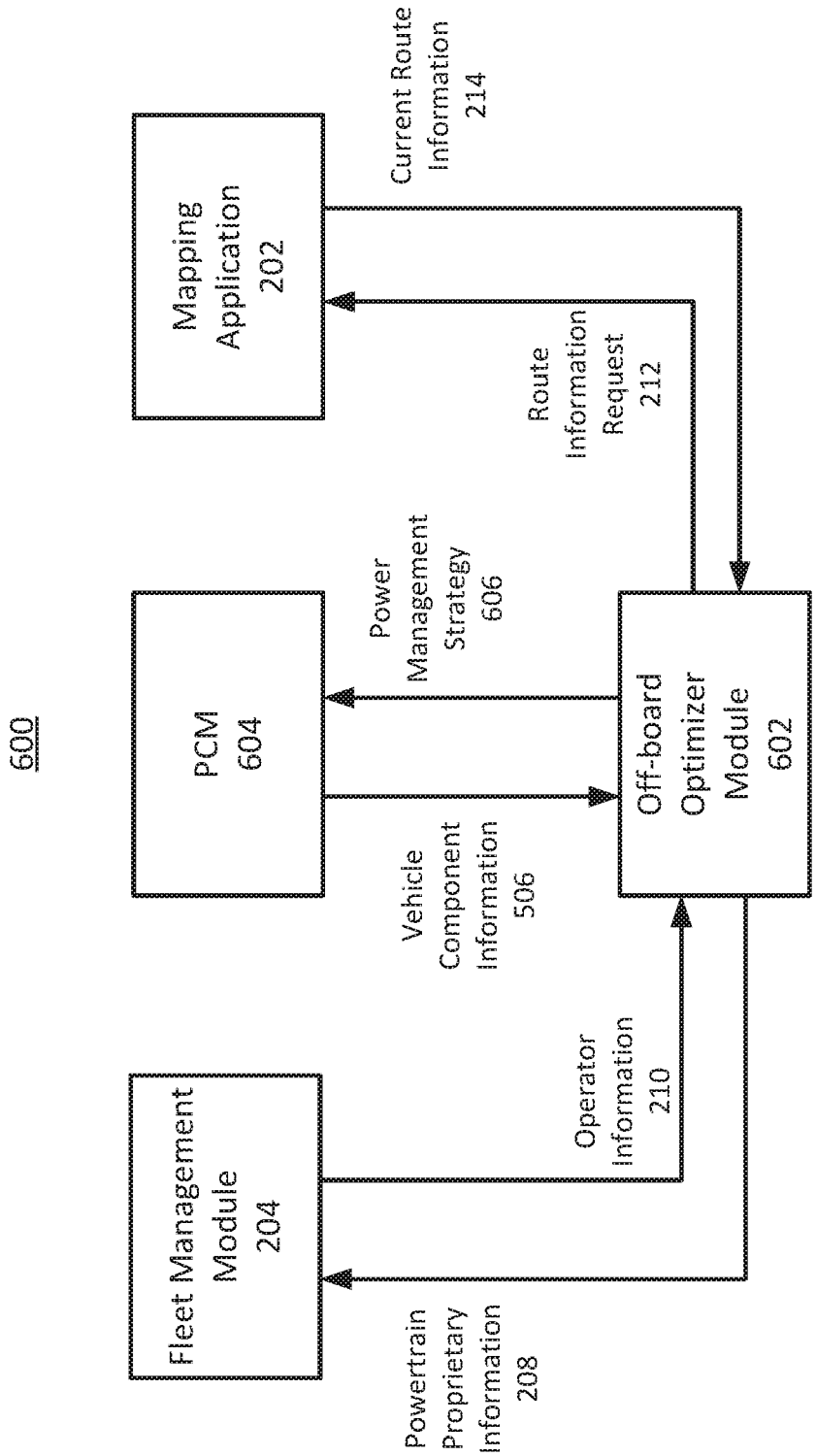
FIG. 6 is a block diagram of an example of a hybrid powertrain system with a fleet management module as well as a mapping application according to one embodiment.

FIG. 6 shows a hybrid powertrain control system 600 according to an embodiment, which includes a PCM 604 as well as the mapping application 202, the fleet management module 204, and an off-board optimizer module 602. Each of the mapping application 202, the fleet management module 204, and the off-board optimizer module 602 is located remotely from the powertrain 604 and is accessed wirelessly or wired via any suitable means of digital communication, such as via the Internet, local area network (LAN), controller area network (CAN) bus, cloud network, etc. In some examples, the off-board optimizer module 602 is a cloud computation source, such as a remote server or computing devices accessible via the cloud network, such that the PCM 604 does not need to rely on the processing power of its on-board processing unit to perform the calculations and/or simulations necessary to determine the powertrain management strategy. Instead, the off-board optimizer module 602 can be the provider of cloud services which act as the computational resource based on the data provided by the fleet management module 204, PCM 604, and mapping application 202.

Therefore, in this embodiment, each of the management module 204, PCM 604, and mapping application 202 communicates with the off-board optimizer module 602 to provide and receive different types of data. For example, the fleet management module 204 transmits the operator information 210 to the optimizer module 602 and receives the powertrain proprietary information 208 in return. The mapping application 202 receives the route information request 212 from the optimizer module 602 and transmits the current route information 214 in return. The PCM 604 uses the sensors associated with each component in the vehicle to gather and transmit the vehicle component information 506 to the optimizer module 602 and receives the power management strategy 606 in return.

There are numerous advantages in implementing the aforementioned optimization methods and systems. In one example, the optimization is customizable based on different factors to suit different needs of the user, such as performance, efficiency, environmental impact, component life, and overall balance among these factors. Also, the ability for the management module or control center to access the most up-to-date information allows for the control center to make intelligent decisions as to which vehicles are best suited for certain tasks and missions, thus providing a more reliable and efficient network of a fleet of vehicles that would otherwise be independently operated and managed. Data sharing between different groups or entities, for example between the control center, database, and the powertrain control module, ensures consistency between the analysis performed by the control center regarding the predicted performance of the individual vehicles and the actual resulting performance of such vehicles.

Described below are some examples of how the power management strategy 606 are used to affect the PCM 110 or 604. In one example, the optimizer module (which may be on-board 206 or off-board 602) uses digital twin of the hybrid powertrain 100 to perform accurate estimation of the energy-per-mile requirement, total energy requirement, and/or power trajectory requirement for the hybrid powertrain 100 using historical data and/or lookahead data. The historical or lookahead data includes factors such as the accessory loads, driving style of the operator/user of the vehicle, predicted traffic, weather conditions, vehicle component efficiencies, amount of load delivery, and potential for regenerative braking by the vehicle. Additionally, key performance metrics such as fuel consumption, impact of each mission to the life of vehicle components, route time, time to fully recharge and refuel the vehicle, and/or the range of distance driven by the vehicle solely using electric power (a.k.a. electric-only range), among other factors, may also be estimated. Such data estimated by the optimizer module 206 or 602 is inputted into the PCM 110 or 604 as part of the power management strategy 606. In some examples, this data can also be incorporated into the powertrain proprietary information 208 that is inputted into the fleet management module 204. In some examples, this data can be used by the PCM 110 or 604 to permit emergency battery usage (i.e., using the battery 108 at or below a minimum SOC limit as set forth by the manufacturer) when the criticality of providing immediate power for the vehicle outweighs the need to maintain component life of the battery 108.

In some examples, the aforementioned estimation results are combined with the operator information 210, which may include any one or more of the fleet performance preference data as previously explained, in order for the optimizer module 206 or 602 to optimize operation of the range extender (for example, the engine or range extender 102) as well as any electrical accessories (for example, traction motors used to maneuver the vehicle). In one example, operation of the range extender 102 is adjusted during cold weather to operate longer in order to keep the aftertreatment system coupled with the range extender 102 sufficiently warm, thereby reducing the cold start emissions. In another example, the power splitting strategy between the range extender 102 and the battery 108 is optimized based on the information of where gas stations or charging stations are located en route. Such information may also include the duration or how long the fuel or battery can last before depleting completely as well as the C-rate of the battery. In another example, the aforementioned estimation results are combined with the operator's input of desired target SOC for the battery 108 that the operator prefers to have by the end of the mission, in order to adjust how much the range extender 102 is to be operated in order to achieve such SOC. For example, if the operator prefers higher SOC at the end of the emission, the range extender 102 can be used more frequently to not only drive the vehicle but also charge the battery 108 in the process.

Adjusting the final target SOC for the battery 108 allows for more room to implement regenerative braking if the route's grade information, or where in the route will the vehicle go uphill or downhill. If it is known that the vehicle will go downhill at the start of the next mission (or relatively early on after starting the mission), the optimizer module 206 or 602 can utilize regenerative braking to charge the battery 108 during the start of the mission without risking the battery 108 depleting to a below-operable SOC. Therefore, this allows for the SOC to remain relatively low at the end of the current mission and still enables the battery 108 to provide power during the next mission. Furthermore, if the next mission is determined to require less than a full charge of the battery 108, the final target SOC of the current mission can be lowered accordingly to assist with the battery life.

As previously explained, energy supplied to the battery 108 can also come from power grids, but relying on the power grid to supply all the energy needed may be costly depending on the electricity price (e.g. cost per kilowatt-hour of electricity) and the fuel price (e.g. cost per gallon of fuel). Thus, to reduce cost, range extender 102 may be utilized to reduce the amount of energy supplied by the power grids. For example, before the mission starts, the optimizer module 206 or 602 may decide to charge the battery 108 using the power grids only until the SOC of the battery 108 reaches a predetermined value, after which energy can be supplied using the range extender 102 during the mission. In some examples, the battery 108 may be charged to specific SOC levels based upon the request of the operator.

In some examples, vehicle acceleration rate management may be based on the real-time traffic information provided by the mapping application 202 and the fleet preference information provided by the fleet management module 204. Managing vehicle acceleration rate can improve safety and fuel economy of the vehicle, such as by restricting the amount of acceleration rate permitted during mid to heavy traffic conditions, during which the optimizer module 206 or 602 decides that there is no need for the vehicle to accelerate beyond a certain limit. Furthermore, base regenerative braking and brake blending level may be adjusted to achieve desired braking performance as determined by the optimizer module 206 or 602. Specifically, in one example, the regenerative braking may be adjusted based on weather, ambient, or road conditions. In another example, regenerative braking may be adjusted to train drivers who are new to electric vehicles, since some electric vehicles with the regenerative braking system uses a single pedal to accelerate and stop the vehicle.

In some examples, stop duration and location of the vehicle may be used by the optimizer module 206 or 602 to determine the timing to perform diesel particulate filter regeneration (DPF regen) for diesel-fueled range extenders 102. DPF regen happens when the trapped particulates within the diesel range extender 102 heat up enough to combust and turn to ash, and the resulting buildup of soot is then removed as gaseous carbon dioxide via passive (soot burns off as fast as it is generated), active (soot accumulates while idling or moving slowly during heavy traffic), or forced (when the soot level rises to a certain point at which it must be forced out of the system) regeneration. Understanding the stop duration and the location of the vehicle allows for the optimizer module 206 or 602 to determine when the DFP regen can take place, as well as which of the passive or active regen to perform. Furthermore, geofencing or location information can be used by the optimizer module 206 or 602 to determine when to switch between hybrid and electric-only modes for the vehicle to meet the emission requirements set by local jurisdictions.

In some examples, information on the weather and the battery SOC can be used for efficiently charging the battery 108. For example, during cold weather, the charging power of the vehicle can be adjusted such that the battery 108 remains charged up until the start of the mission in order to keep the battery 108 at or above a certain temperature. Furthermore, the charging power can be adjusted based on the battery temperature such that the battery temperature is maintained within an acceptable range of temperatures.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible. The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A drive system for a hybrid vehicle comprising:
a powertrain comprising an engine, an electric motor, and an energy storage device electrically coupled to the electric motor;
a plurality of sensors; and
an optimizer module operatively coupled to the powertrain, the optimizer module configured to:
receive, from a remote management module, operator information to travel a route;
receive, from a mapping application in response to the operator information, current route condition information for the route;
measure, using the plurality of sensors, current vehicle status information for the hybrid vehicle;
update, in real time based on the current vehicle status information, a digital twin that is generated by the optimizer module to form a digital representation of physical components of the powertrain; and
decide, using the digital twin, a power management strategy for the vehicle based on the current route condition information and the current vehicle status information.

2. The drive system of claim 1, wherein the optimizer module is configured to control, based on the power management strategy, at least one of: the engine, the electric motor, or the energy storage of the vehicle.

3. The drive system of claim 1, wherein the current vehicle status information includes at least one of: vehicle type and architecture, vehicle availability, vehicle mass, vehicle mileage, a state of charge (SOC) of the energy storage device and an amount of time to fully recharge the same, a state of health (SOH) of the energy storage device, an amount of fuel in a fuel tank fluidly coupled to the engine and an amount of time to fully refuel the same, or a full range of the vehicle based on the SOC or the amount of fuel.

4. The drive system of claim 1, the optimizer module further configured to provide powertrain proprietary information of the vehicle to the remote management module after the vehicle completes traveling the route.

5. The drive system of claim 4, wherein the powertrain proprietary information includes at least one of: fuel and energy efficiency information, component life information, fault conditions, or chance of derating of the vehicle.

6. The drive system of claim 1, wherein the current route condition information includes at least one of: speed limit information, road grade information, refueling station location information, charging station location information, traffic information, weather information, terrain information, and zoning information.

7. The drive system of claim 1, wherein the optimizer module decides the power management strategy by using online learning from historical and lookahead data.

8. A method for operating a hybrid vehicle with a powertrain comprising an engine and an electric motor, a plurality of sensors, and an optimizer module operatively coupled to the powertrain, the method comprising:
receiving, by the optimizer module from a remote management module, operator information to travel a route;
receiving, by the optimizer module from a mapping application, current route information for the route;
measuring, using the plurality of sensors, current vehicle status information for the hybrid vehicle; and
updating, in real time, based on the current vehicle status information, a digital twin that is generated by the optimizer module to form a digital representation of physical components of the powertrain;
deciding, by the optimizer module using the digital twin, a power management strategy for the vehicle based on the current route condition information and the current vehicle status information.

9. The method of claim 8, further comprising controlling, by the optimizer module, at least one of the engine, the electric motor, or an energy storage device coupled to the electric motor of the vehicle, based on the power management strategy.

10. The method of claim 8, wherein the current vehicle status information includes at least one of: vehicle type and architecture, vehicle availability, vehicle mass, vehicle mileage, a state of charge (SOC) of an energy storage device coupled to the electric motor and an amount of time to fully recharge the same, a state of health (SOH) of the energy storage device, an amount of fuel in a fuel tank coupled to the engine and an amount of time to fully refuel the same, or a full range of the vehicle based on the SOC or the amount of fuel.

11. The method of claim 8, further comprising:
providing, by the optimizer module, powertrain proprietary information of the vehicle to the remote management module after the vehicle completes traveling the route.

12. The method of claim 11, wherein the powertrain proprietary information includes at least one of: fuel and energy efficiency information, component life information, fault conditions, or chance of derating of the vehicle.

13. The method of claim 8, wherein the current route condition information includes at least one of: speed limit information, road grade information, refueling station location information, charging station location information, traffic information, weather information, terrain information, or zoning information.

14. A vehicle fleet management system comprising:
a plurality of hybrid vehicles, each vehicle including a powertrain comprising an engine, a fuel tank fluidly coupled to the engine, an electric motor, and an energy storage device electrically coupled to the electric motor, and an optimizer module operative coupled to the powertrain; and
a remote management module operative to:
receive powertrain proprietary information of each of the plurality of hybrid vehicles from the optimizer module,
determine, based on the powertrain proprietary information, which of the plurality of hybrid vehicles to instruct to travel a route, and
transmit operator information to travel the route to the determined hybrid vehicle;
the optimizer module of the determined vehicle configured to:
receive, from a mapping application in response to the operator information, current route condition information for the route,
measure current vehicle status information for the hybrid vehicle,
decide a power management strategy for the vehicle based on the current route condition information and the current vehicle status information, and
control at least one of the engine or the electric motor of the vehicle based on the power management strategy.

15. The system of claim 14, wherein the optimizer module is configured to:
measure the current vehicle status information for the hybrid vehicle using one or more sensors;
update, in real time based on the current vehicle status information, a digital twin that is generated by the optimizer module to form a digital representation of physical components of the powertrain; and
decide, using the digital twin, a power management strategy for the vehicle based on the current route condition information and the current vehicle status information.

16. The system of claim 14, wherein the optimizer module is configured to:
generate a digital twin of the determined vehicle that forms a digital representation of physical components of the powertrain of the determined vehicle;
compute, based on the digital twin, a range of distance that can be traveled by the determined vehicle using electrical vehicle components of the powertrain of the determined vehicle; and
determine, based on the digital twin, a fuel economy and a predicted time to charge or refuel the determined vehicle.

17. The system of claim 16, wherein the optimizer module is configured to:
update the digital twin of the determined vehicle in real time using measurement data from one or more sensors of the determined vehicle.

18. The system of claim 14, wherein the optimizer module is configured to:
generate a digital twin of the determined vehicle that forms a digital representation of physical components of the powertrain of the determined vehicle; and
perform, based on the digital twin using historical data and lookahead data, an estimation of at least one of: an energy-per-mile requirement, a total energy requirement, or a power trajectory requirement associated with the powertrain of the determined vehicle.

* * * * *